UNITED STATES PATENT OFFICE.

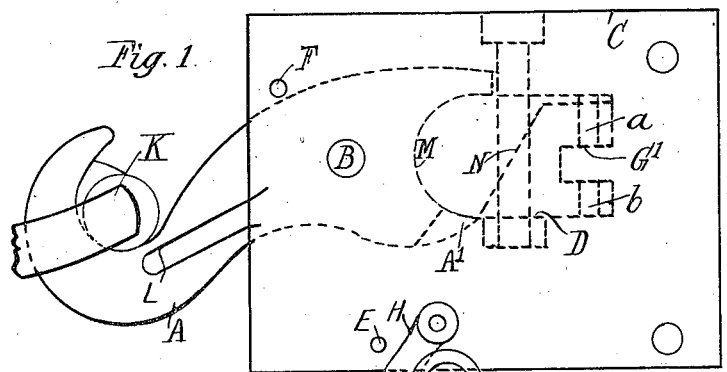

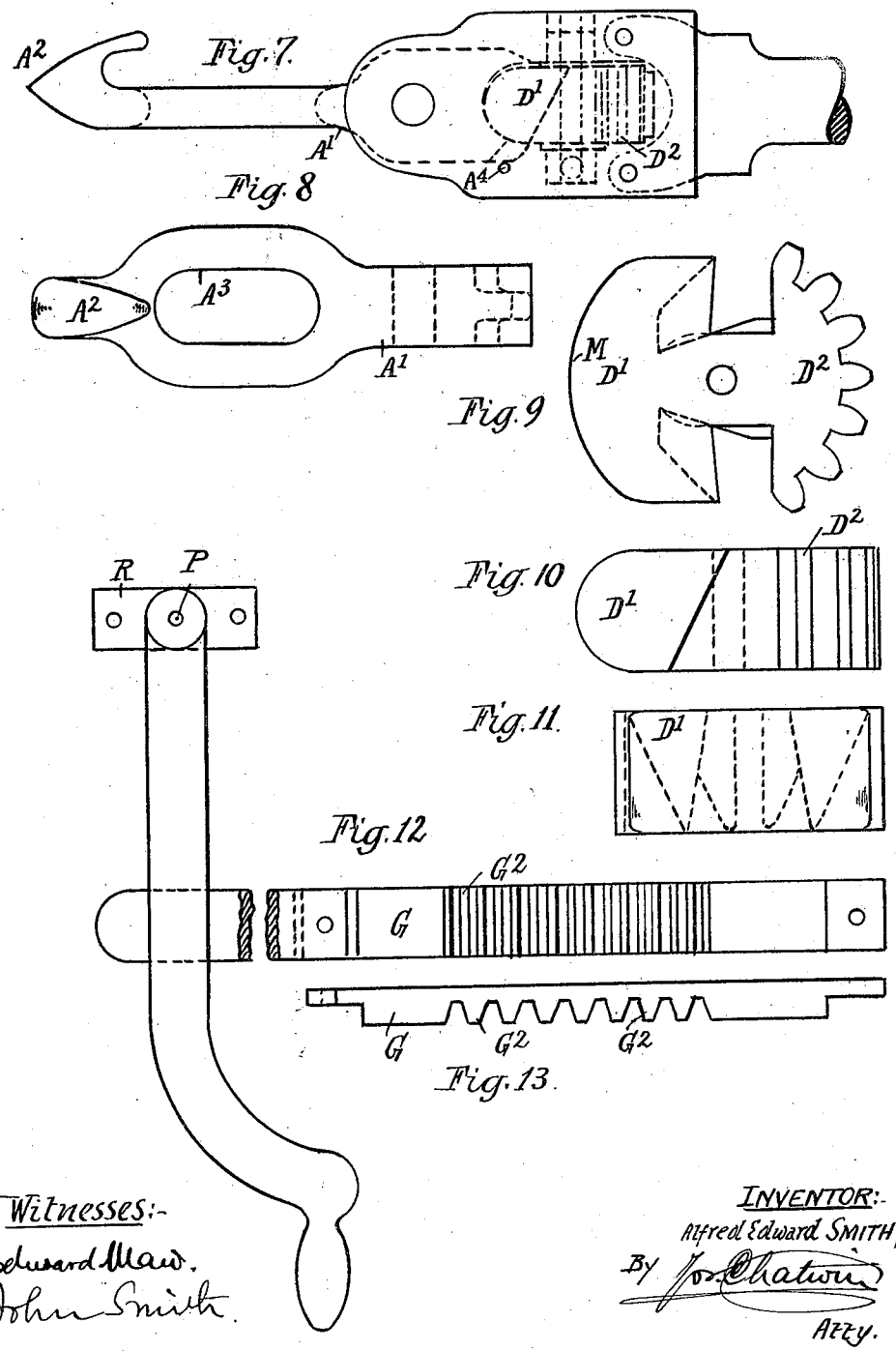

ALFRED EDWARD SMITH, OF LONDON, ENGLAND.

SLIP-HOOK.

1,379,786.  Specification of Letters Patent.  Patented May 31, 1921.

Application filed May 19, 1919. Serial No. 298,350.

*To all whom it may concern:*

Be it known that I, ALFRED EDWARD SMITH, a subject of the King of England, residing at London, in the Kingdom of England, have invented new and useful Improvements in Slip-Hooks, of which the following is a specification.

My invention relates to slip hooks, its object being to provide a simplified construction insuring facility of operation and cheapness of manufacture. For this purpose I provide the following arrangement, viz: a hook, pivoted to move vertically between side plates or to a base plate, said hook having a curved recess at the rear end to engage a correspondingly curved surface of a transversely turnable member operated by a hand lever into a middle locking position or into an unlocking position at either side.

A small hook may be conveniently fitted on the base plate to hold the chain, rope or the like when used with the slip hook, and which swings idly aside when the chain, or the like, is released from the slip hook.

In order that my invention may be clearly understood I will describe the same with reference to the accompanying drawings in which:—Figure 1, is a side view of the complete slip hook with the operating handle removed; Fig. 2 is a front view at the handle end of the slip member for locking the hook, drawn to a larger scale; Fig. 3 shows the operating handle in plan; Fig. 4 is a plan of the slip-member; Fig. 5 a plan; Fig. 6 a rear view all to a larger scale; Fig. 7 shows a side view of a modified construction; Fig. 8 the hook member in plan; Fig. 9 a plan of the slip member; Fig. 10 a side view of the slip; Fig. 11 a rear view of same; Fig. 12, a modified handle-lever in elevation and Fig. 13 a plan of a portion of such handle-lever to show the teeth.

The hook A is pivoted at B between side plates C on which is turnably mounted the operating slip D for lateral movement. Pins E and F are fixed on the plates C so as to limit the movement of the hook A, while a handle G is suitably articulated to the slip D for actuating or controlling the same in such a manner as to thereby drop the hook, or elevate and then lock it in that position. The pivoted portion of the hook fits between the plates C and has a practically semi-circular recess across the tail end which is in constant engagement with the head of the slip D.

The plates C may carry the small pivoted hook H which serves to retain a ring shackle I.

The head of the slip D has a semi-circular form cut at each side to a rounded inclined surface starting at N and tapering from $N^1$ to $N^2$ thus leaving a recess or clearance $N^3$ in which the inverted cone-shaped tip $A^1$ of the hook can slide. The slip thus has a rounded head surface M to engage in the correspondingly shaped rear portion of the hook A, while the cut-away cone-shaped faces of said head, turned aside, provide space for the passage of the tip $A^1$.

The hand lever G fits in the recess $G^1$ of the slip D so when pushed it will turn the slip D. It is preferably secured to a handle pivoted at P to a block R to give more powerful and easier leverage. A pin, not shown, passes through a hole $a$ and $b$ and through a hole $g$ in the lever G which is entered through an opening in one of the plates C, and projects laterally of the hook A either to the right or left since the slip can be actuated from whichever side is preferred.

The operation is as follows: By pushing the handle lever G from its middle or locking position so as to turn the slip D the latter will release the slip hook A by permitting the end $A^1$ to slide up along one of the inclined faces $N^1$, $N^2$ limited by the line N and so allow the hook A to drop against the pin E into the disengaged position, when the chain K will be released on the fixed rod L.

To right the hook it is necessary to pull the handle and lever G to its median position in order to turn back the slip D, the inclined or tapered face $N^1$, or $N^2$, of which then forces the tip $A^1$ of the hook A back into its locked position *i. e.* causes it to run down the incline of the slip and thus right the hook and finally lock it in position against the stop F, the round portion M assisting the replacement and effecting the locking of the hook. Safety means may be provided on the handle G to hold the same securely in either position, thus giving an additional security to the slip D, which may be operated from either hand as desired since the slip is symmetrical in shape.

According to a modified form shown in

Figs. 7 to 13, I form the hook member A¹ with a tapered or slanting nose A² and of an open link-shape A³ at its forward end with the object of avoiding the use of coupling chains. Owing to the usual uneveness in the rails, any pair of hooks will always be in such a position that one is higher than the other and will readily slide over the taper end A² to engage in the center open link A³ thereby coupling the trucks or coaches automatically with the hooks in the locked position due also to the oscillatory movement of the hook on its pivot.

In this construction I also prefer to form the slip member D¹ with a toothed segment D² and provide corresponding teeth G² on the hand lever G. This arrangement provides a more definite movement and is found in practice to be a preferred construction. At the lower rear end of the hook A¹ I provide a bearing tip A⁴ for the locked position, for greater strength. The top portion Z of the slip D¹ may be made in the form of a detachable plate screwed or otherwise secured in its position. This facilitates construction; the head of the slip being similar in shape to the taper head of the slip D.

I claim:—

1. A slip hook in combination with side plates pivotally supporting same, a curved tapering head on a turnable member having teeth formed on a segmental portion thereof, and a toothed hand-lever to engage with those on the turnable member as stated.

2. A slip hook formed with an open link portion and a slanting nose-piece, pivoted between side plates and having a curved recess at the rear to engage a correspondingly curved inclined surface of a turnable member, teeth formed on a segmental portion of the turnable member and teeth formed on the hand-lever to engage with those on the turnable member, as stated.

3. A slip hook formed with an open link portion and a slanting nose-piece, pivoted between side plates and having a curved recess at the rear to engage a correspondingly curved inclined surface of a turnable member, formed with a detachable top plate, teeth formed on a segmental portion of the turnable member and teeth formed on the hand-lever to engage with those on the turnable member, as stated.

ALFRED EDWARD SMITH.